Patented May 10, 1949

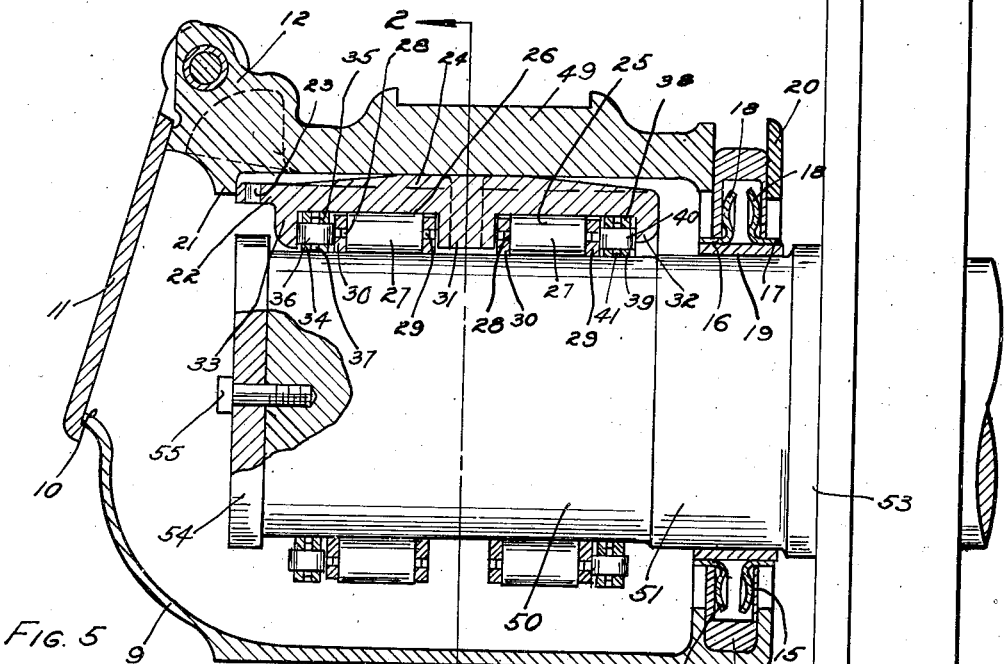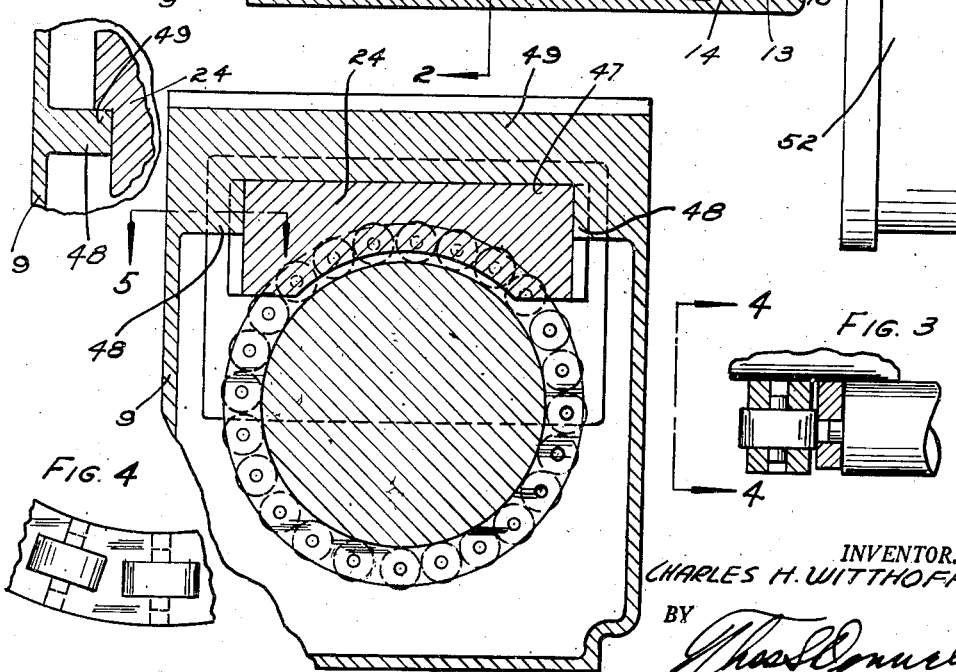

2,469,676

UNITED STATES PATENT OFFICE 2,469,676

ANTIFRICTION BEARING

Charles H. Witthofft, Detroit, Mich., assignor of one-half to Joseph F. Gohn, Grosse Ile, Mich.

Application October 23, 1947, Serial No. 781,561

3 Claims. (Cl. 308—180)

My invention relates to a new and useful improvement in an anti-friction bearing adapted primarily for use on railroad cars in which a journal box is used into which the axle projects and on which the car body is supported.

It is an object of the present invention to provide an anti-friction bearing adapted for use on railroad cars so arranged and constructed that a minimum resistance to the rotation of the axle is presented.

Another object of the invention is the provision of a bearing combining therewith the axle supportnig bearing and an end thrust bearing so that when end thrusts are delivered to the axle and it moves relatively to the journal box or wedge mounted therein a minimum of friction will be encountered.

Another object of the invention is the provision of an anti-friction bearing of this class which will be simple in structure, economical of manufacture, durable, compact, highly efficient in use, and easily and quickly installed in position and removed from operative position.

Other objects will appear hereinafter.

It is recognized that various modifications and changes may be made in the detail of structure illustrated without departing from the invention and it is intended that such shall be embraced within the scope of the claims which form a part hereof.

Forming a part of this specification are drawings in which

Fig. 1 is a central, vertical, sectional view of the invention showing it applied, Fig. 2 is a fragmentary, sectional view taken on line 2—2 of Fig. 1, Fig. 3 is a fragmentary, enlarged sectional view showing the end thrust bearing, Fig. 4 is a fragmentary view taken on line 4—4 of Fig. 3, Fig. 5 is a fragmentary, sectional view taken on line 5—5 of Fig. 2.

As shown in the drawings, the invention is adapted for use with an axle 50 on which is mounted a wheel 52 in engagement with the enlarged shoulder 53 on the axle. This axle 51 projects into a journal box 9 which is open at 10 at its outer side and this opening suitably closed by a closure 11 pivoted on the boss 12 which extends upwardly and outwardly from the top 49 of the journal box 9.

Mounted on an enlarged portion 51 of the axle is a sealing mechanism comprising an annular bushing 19 surrounding which are the annular resilient members 16 and 17, each of which has an outwardly turned flange 18 engaging between the side walls 14 and 15 of a retainer 13 which is held in position at one side by the annular wall or inner wall 20 of the journal box.

Projecting downwardly from the top 49 at the outer end thereof is a flange 21 against which engages a ledge 22 of the wedge 24. This ledge 22 has an opening 23 formed therein facilitating the removal and placement of the wedge 24 relatively to the journal box 9.

Formed in the inner face of this wedge 24 are the spaced apart recesses 25 and 26 in each of which engages a bearing comprising spaced apart rollers 27, each having trunnions 28 at the opposite end engaging an opening formed in the annular retaining rings 29 and 30 which embrace the bearing portion 50 of the axle. In operation, when the axle is rotated, the bearings will also rotate so that the retaining rings 29 and 30 also travel around the axle while it is being rotated. Between the recesses 25 and 26 is a ridge-forming portion 21 which serves as an abutment for one side of these roller bearings.

Projecting inwardly from the inner edge of the wedge 24 is an inwardly projecting flange 32 and a similar inwardly projecting flange 33 extends inwardly at the opposite end of the wedge 24. Bearing against the face of this flange 33, and also against the face of the retaining ring 30, is a plurality of spaced apart rollers 36 each of which is provided with a trunnion on its sides engaging an opening formed in the retaining rings 34 and 35 which are concentrically arranged. It will be noted that the rollers 36 are of larger diameter than the retaining rings 34 and 35 as the rollers 27 are also of larger diameter than the retaining rings 29 and 30. Engaging against the inner face of the flange 32 is a plurality of spaced apart rollers 40, each of which is provided on opposite sides of the trunnion 41 engaging the openings formed in the retaining rings 38 and 39 which are concentrically arranged. Secured on the outer face of the axle portion 50 is a retaining disc 54 held in position by means of the bolts 55.

A longitudinal shifting of the wedge 24 relatively to the journal box is also resisted by the flange 48 which projects inwardly from opposite sides of the journal box 9 and engages the shoulder 49 formed on the wedge 24.

The construction is such that when a load is placed on the journal box, the load will be transmitted through the bearings 27 to the axle portion 50 and upon a rotating of the axle, the rollers will rotate on their own axis and the rings 29 and 30 will also rotate around the axis, thus providing a very efficient bearing for purposes of this kind. At the same time, any end thrust delivered to either side of the bearing will be taken up by the end bearings and the rollers 36 will rotate on their axis and the retaining rings 35 and 34, which are concentric of each other, will also rotate around the axle. The same is true concerning the rollers 40 and the retaining rings 38 and 39. In this way, the friction normally encountered when there is a longitudinal shifting of the journal box relatively to the axle is eliminated and a free and easy rolling of the axle is thus effected.

Experience has shown that the bearing embodies the rollers 27 and the bearing embodying the rollers 36 or the rollers 40 are necessary in the arrangement indicated and that these bearings must co-operate with each other in order that an efficiently operating bearing can be provided for this purpose. Consequently, while there is a pair of separate parts, each in itself constituting a bearing, the two parts themselves also may be said to constitute a single bearing which will take care of longitudinal thrust and radial thrust at the same time.

What I claim as new is:

1. An anti-friction bearing of the class described, adapted for use on railroad cars embodying a journal box and an axle with one end of the axle projecting into said journal box, comprising: a wedge positioned in said journal box and having on its inner face a pair of spaced apart recesses, said wedge overlying the upper portion of the axle projected into said journal box; a pair of spaced apart retaining rings embracing said axle and longitudinally spaced on said axle; a plurality of circumferentially spaced roller bearings mounted between each of said retaining members and adapted for engaging the axle in response to radial thrust, said members and said rollers traveling around said axle upon rotation of said axle; and a pair of concentric rings positioned in each of said recesses at one side thereof; a plurality of rollers mounted between said concentric rings and rotatable on a radially directed axis, said retaining rings and said rollers being adapted for traveling around said axle upon rotation of same, said rollers between said concentric rings engaging one face of the first named retaining rings.

2. An anti-friction bearing of the class described, adapted for use on railroad cars embodying a journal box and an axle with one end of the axle projecting into said journal box, comprising: a wedge positioned in said journal box and having on its inner face a pair of spaced apart recesses, said wedge overlying the upper portion of the axle projected into said journal box; a pair of spaced apart retaining rings embracing said axle and longitudinally spaced on said axle; a plurality of circumferentially spaced roller bearings mounted between each of said retaining members and adapted for engaging the axle in response to radial thrust, said members and said rollers traveling around said axle upon rotation of said axle; and a pair of concentric rings positioned in each of said recesses at one side thereof; a plurality of rollers mounted between said concentric rings and rotatable on a radially directed axis, said retaining rings and said rollers being adapted for traveling around said axle upon rotation of the same, said rollers between said concentric rings engaging one face of the first named retaining rings; and a flange projecting inwardly at opposite ends of said wedge, the inner faces of each of said flanges engaging the rollers positioned between said concentric rings.

3. An anti-friction bearing of the class described, adapted for use on railroad cars embodying a journal box and an axle with one end of the axle projecting into said journal box, comprising: a wedge positioned in said journal box and having on its inner face a pair of spaced apart recesses, said wedge overlying the upper portion of the axle projected into said journal box; a pair of spaced apart retaining rings embracing said axle and longitudinally spaced on said axle; a plurality of circumferentially spaced roller bearings mounted between each of said retaining members and adapted for engaging the axle in response to radial thrust, said members and said rollers traveling around said axle upon rotation of said axle; and a pair of concentric rings positioned in each of said recesses at one side thereof; a plurality of rollers mounted between said concentric rings and rotatable on a radially directed axis, said retaining rings and said rollers being adapted for traveling around said axle upon rotation of the same, said rollers between said concentric rings engaging one face of the first named retaining rings; and a flange projecting inwardly at opposite ends of said wedge, the inner faces of each of said flanges engaging the rollers positioned between said concentric rings, said concentric rings being of smaller width than the diameter of the roller positioned between the same and said rollers being mounted centrally of said rings for projecting the periphery of said roller beyond the side faces of said concentric rings.

CHARLES H. WITTHOFFT.

REFERENCES CITED

The following references are of record in the file of this patent:

UNITED STATES PATENTS

| Number | Name | Date |
| --- | --- | --- |
| 1,064,863 | Sharpneck | June 17, 1913 |
| 1,587,735 | Morgan | June 8, 1926 |